United States Patent
Masao

[19]

[11] Patent Number: 6,002,485

[45] Date of Patent: Dec. 14, 1999

[54] MULTIVARIABLE MEASURING ELLIPSOMETER METHOD AND SYSTEM

[75] Inventor: Katsuya Masao, Tokyo, Japan

[73] Assignee: Heureka Co. Ltd., Tokyo, Japan

[21] Appl. No.: 08/969,346

[22] Filed: Nov. 28, 1997

[30] Foreign Application Priority Data

Nov. 27, 1996 [JP] Japan .................................... 8-353423

[51] Int. Cl.$^6$ .................................................. G01B 11/06
[52] U.S. Cl. ........................................... 356/369; 356/382
[58] Field of Search ..................................... 356/369, 381, 356/382

[56] References Cited

U.S. PATENT DOCUMENTS

| | | | |
|---|---|---|---|
| 4,908,508 | 3/1990 | Dubbeldam | 356/369 |
| 4,942,539 | 7/1990 | McGee et al. | 364/513 |
| 5,329,357 | 7/1994 | Bernoux et al. | 356/369 |
| 5,666,200 | 9/1997 | Drevillon et al. | 356/369 |
| 5,737,069 | 4/1998 | Nashiki et al. | 356/5.13 |

*Primary Examiner*—Richard A. Rosenberger
*Attorney, Agent, or Firm*—Armstrong, Westerman, Hattori, McLeland & Naughton

[57] ABSTRACT

The present invention discloses an ellipsometer that is able to provide multivariable measurement and analysis of optical constants of sample, comprising: a semiconductor laser diode that serves as the light source; a Pertie device attached to the semiconductor laser diode; a collimator for making the light parallel; a polarizer for transforming the light into a suitable linearly polarized state and radiating onto the sample; an analyzer for converting the light reflected from the sample into suitable linearly polarized light; and, a photosensor; wherein, the wavelength of light radiated from the semiconductor laser can be changed by changing the case temperature of the semiconductor laser by a Pertie device. This ellipsometer is used to perform measurement using multiple wavelengths to obtain an initial model of the optical constants of each layer after which, by starting from this model, the optical constants of each layer are systematically calculated from measured values of tan $\Psi$ and cos $\Delta$ at a fixed wavelength in the form of optimization problems in which a multilayer film model is optimized so that the error terms involved in calculating film thickness are minimized. As a result, ellipsometric measurement can be performed that allows calculation of multiple variables.

8 Claims, 6 Drawing Sheets

MULTIVARIABLE MEASURING ELLIPSOMETER METHOD AND SYSTEM

BACKGROUND OF THE INVENTION

(1) Field of the Invention

This invention relates to an ellipsometer, and a method and system for multivariable measurement of sample variables. More specifically, the invention relates to an algorithm that enables multiple variables to be measured and calculated using an ellipsometer, and a method for changing the wavelength of the light source of an ellipsometer. Samples for which this invention is used are thin films formed on the surface of a semiconductor and so forth, and more particularly, samples such as multilayer films that require multivariable measurement.

(2) Description of the Related Art

When measuring a sample by ellipsometry, monochromatic light is radiated onto a sample at a fixed incident angle. In this case, however, since only two variables can be measured, it has been thought that only two optical constants of the sample are obtained by following calculations. In actual samples, however, there are many cases in which it is necessary to measure three or more optical constants as in the case of multilayer films. Consequently, attempts have been made to increase the number of variables that can be measured such as by measuring while changing the incident angle to several different angles, or by using a white light source and switching the wavelength of the light radiated onto the sample with a monochromator (spectroscopic ellipsometer).

However, in the case of methods which change the incident angle of the light, since the shape of the spot formed by the light beam on the surface of the sample changes as the incident angle is changed, measurement with different incident angles cannot be considered to constitute measurement of the same location on the sample. In addition, the penetration depth of the light inside the sample also changes when the incident angle is changed. Thus, gathering measurements at different incident angles and analyzing those measurements as a single piece of data is not correct.

Known examples of spectroscopic ellipsometer include U.S. Pat. No. 5,329,357 of Bernoux, et al. issued on Jul. 12, 1994, and U.S. Pat. No. 5,166,752 of Spanier, et al. issued on Nov. 24, 1992. In these methods in which a monochromatic light is formed with a monochromator from a white light source, when an adequate amount of light is attempted to be obtained, the FWHM (full width at half maximum) of the spectral light increases resulting in problems with purity with respect to the wavelength of the light. Conversely, when the purity of the light is attempted to be improved by narrowing the slit width of the grating, the amount of light decreases, which not only causes a decrease in the S/N ratio of the measurement, but also lowers the parallelism of the light rays within the beam due to diffraction.

Because of these reasons ordinary spectroscopic ellipsometer varies the wavelength of input light in considerable wide range.

The present invention attempts to allow the obtaining of multivariable data from a sample using a method free of the above-mentioned problems during measurement using an ellipsometer.

SUMMARY OF THE INVENTION

The object of the present invention is to provide an ellipsometry algorithm for multivariable measurement and analysis of optical constants of a sample, and to provide an ellipsometer system that enables said measurement and analysis.

In order to achieve this object, the present invention is composed in the manner described below. Namely, the present invention consists of an ellipsometer that is able to change the wavelength of incident light, comprising: a semiconductor laser diode that serves as the light source; a Pertie device attached to the semiconductor laser diode; a collimator for making the light parallel; a polarizer for transforming the light into a suitable linearly polarized state and radiating onto the sample; an analyzer for converting the reflected light to suitable linearly polarized light and, a photosensor; wherein, the wavelength of light radiated from the semiconductor laser can be changed, by changing the case temperature of the semiconductor laser by a Pertie device. This ellipsometer is used to perform measurement using multiple wavelengths to obtain an initial model of the optical constants of each layer after which, by starting from this model, the optical constants of each layer are systematically calculated from measured values of tan Ψ and cos Δ at a fixed wavelength in the form of optimization problems in which a multilayer film model is optimized so that the error terms involved in calculating film thickness are minimized. As a result, ellipsometric measurement can be performed that allows calculation of multiple variables.

DESCRIPTION OF THE PREFERRED EMBODIMENTS

Figure 1:
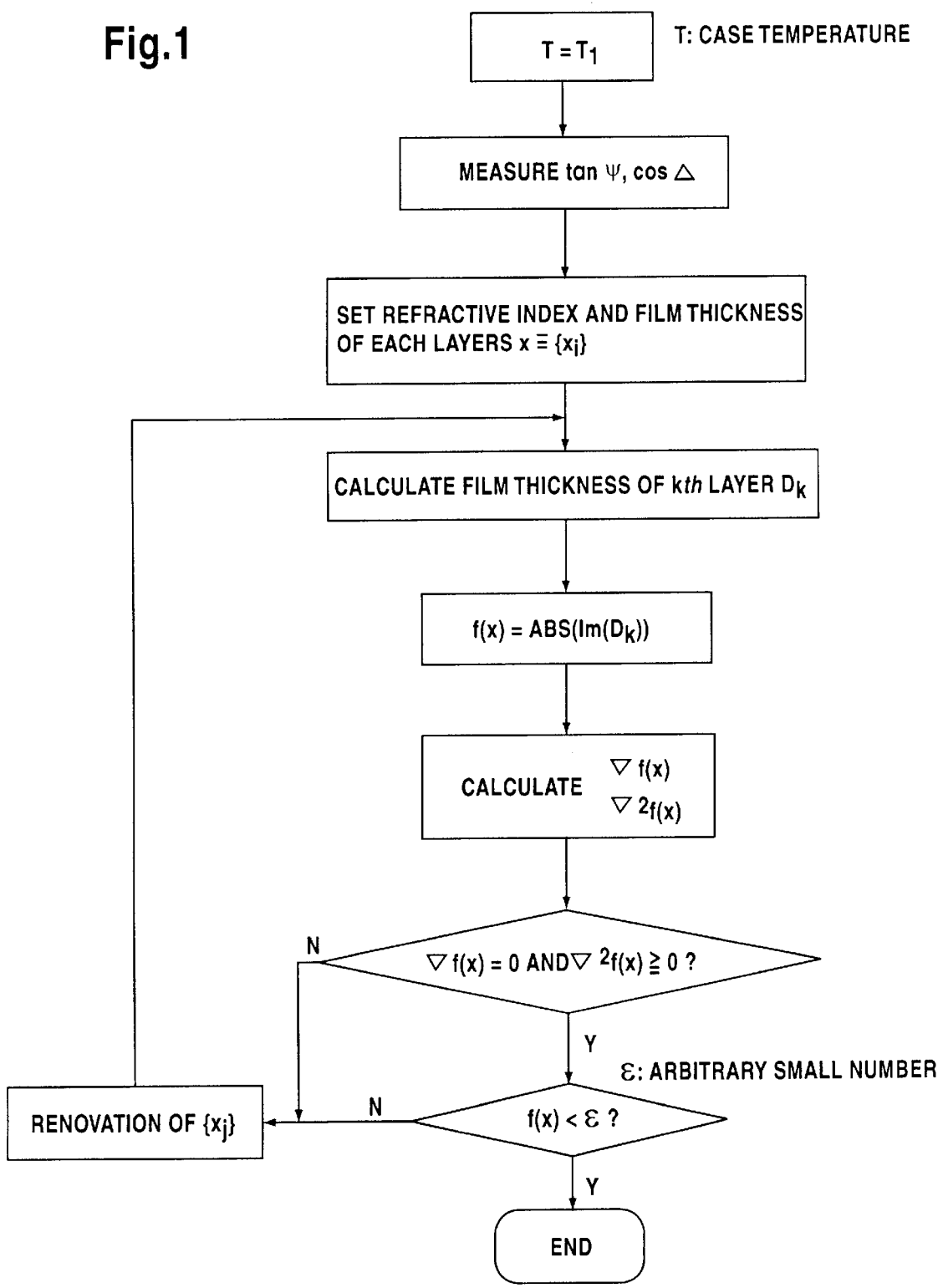
FIG. 1 is a flow chart showing the algorithm for calculating multiple variables according to the present invention.

The same reference numerals are used throughout the entire explanation to indicate those components that have identical or similar functions.

FIG. 1 shows an algorithm for calculating multiple variables with the ellipsometer of the embodiment of present invention.

The case temperature T of laser diode is set constant at T1 and light output is controlled at constant level, and two parameters of the sample, namely tan Ψ and cos Δ, are measured by this ellipsometer.

When the total number of layers is assumed to be n, the set of film thickness, refractive indexes and extinction coefficients of this sample $x=\{X_j\}$ is a point in the 3n+1 dimensional variable space.

The initial point x of variable space are set in advance based on other reasons.

The film thickness $D_k$ of an arbitrary kth layer is calculated starting from this initial value of variable space.

The range of values of the optical constants of each layer that can be physically assumed, is taken to be the restrictive condition of the variable space.

The absolute value of the imaginary part of film thickness of the kth layer f(x) obtained by ellipsometric calculation is taken to be the error term.

This error term is then used as the objective function of the optimization oblem.

The gradient vector $\nabla f(x)$ and Hessian matrix $\nabla^2 f(x)$ of the objective function at a point x in the variable space are calculated.

The calculation is considered to have reached the stationary point when the Hessian matrix $\nabla^2 f(x)$ is positive constant, and the gradient vector $\nabla f(x)$ becomes almost zero.

When the stationary point is reached, and error term is almost zero, then each set of variables and the real part of film thickness of the kth layer, $D_k$ become the determined values.

Otherwise, new set of variables $x=\{x_j\}$ are searched.

In the case of measuring film thickness on a semiconductor, the method of steepest decent or quasi-Newton method are effective for searching for the sequence of points x within the variable space. Since the most effective technique varies according to the type of sample, however, there is no single method that can be applied for all samples.

When the determined values are not reached even after having searched for a predetermined number of steps, the layer on which film thickness calculations are being performed changes to a different layer from the kth layer, after which the above-mentioned calculations are repeated.

In an ellipsometer, linearly polarized light of a certain azimuth is radiated onto a dielectric thin film at a suitable incident angle, the polarized state of the light reflected from the sample is measured. The reflected light is normally in the form of elliptically polarized light, and its state is expressed by two parameters such as the principal axis and ellipticity. Changes in the polarized state caused by reflection are expressed with tan $\Psi$ and cos $\Delta$.

Next, the optical constants of the thin film are calculated using tan $\Psi$ and cos $\Delta$. Assuming that the refractive index of each layer is known, the film thickness of an arbitrary layer is calculated using the parameters of incident angle and wavelength.

At this time, the film thickness that is formally obtained is a complex number, and its imaginary part is not always zero. The absolute value of the imaginary part is considered to be the error term. Possible causes of the error term being greater than zero include measurement error in the measured values for tan $\Psi$ and cos $\Delta$, and incorrect setting of the constants of each layer (incorrect model setting). If measurement is performed with an apparatus in which measurement error can be adjusted so as to be ignored, the cause of the error term can be considered to be due to incorrect model setting. Conversely, searches are made systematically so as to minimize the error term of film thickness, which is the objective function, by using the optical constants of each layer as variables. The sets of calculated values of optical constants for each layer of a multilayer film optimized in this manner are, the determined values. Namely, this is a problem of optimizing multivariable functions in which the objective function, namely the error term of film thickness, is minimized.

Figure 2:
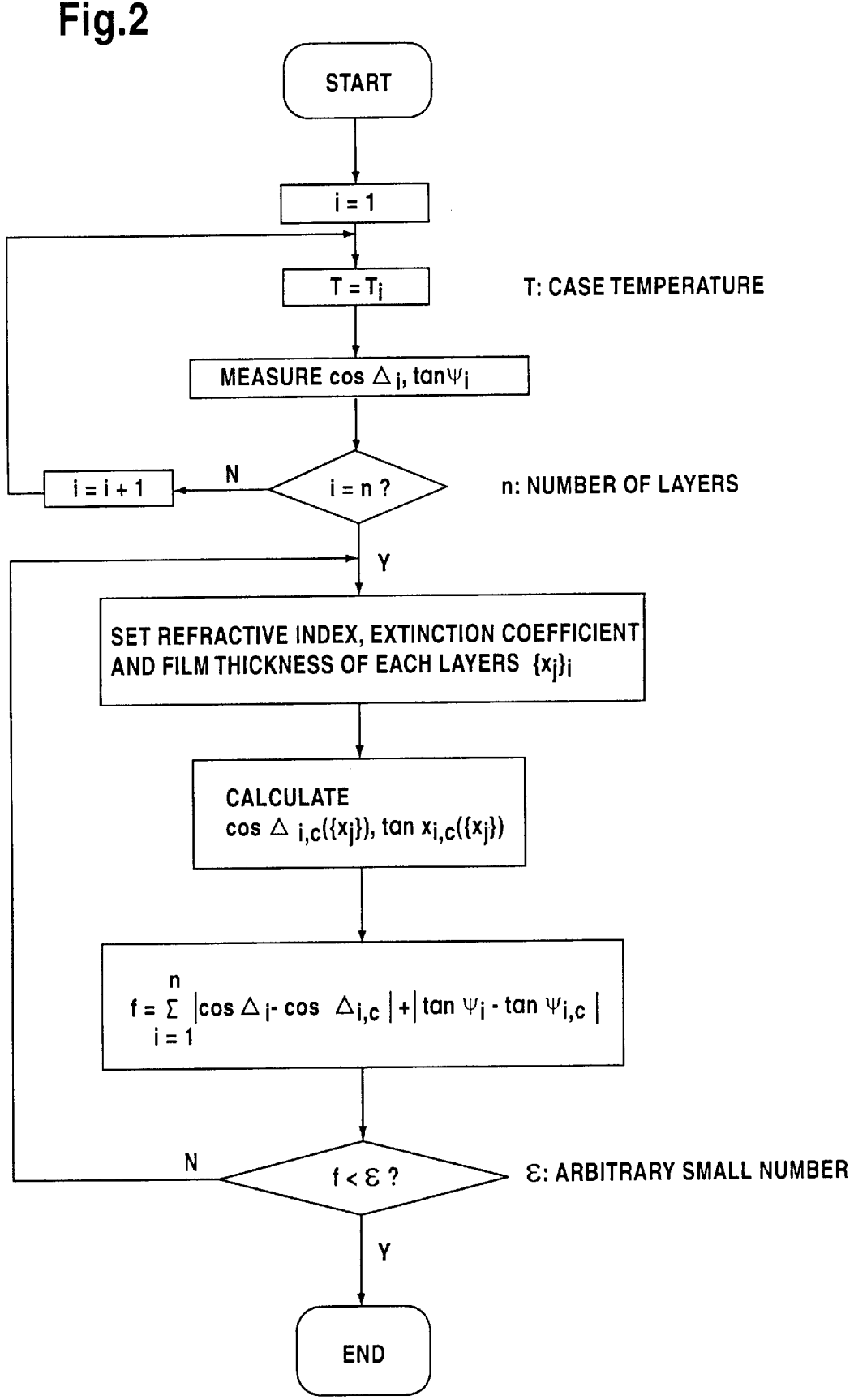
FIG. 2 is a flow chart showing the algorithm for calculating a model of multilayer film according to the present invention.

FIG. 2 shows the algorithm for calculating a model of multilayer film of the ellipsometer of this embodiment.

Figure 3:
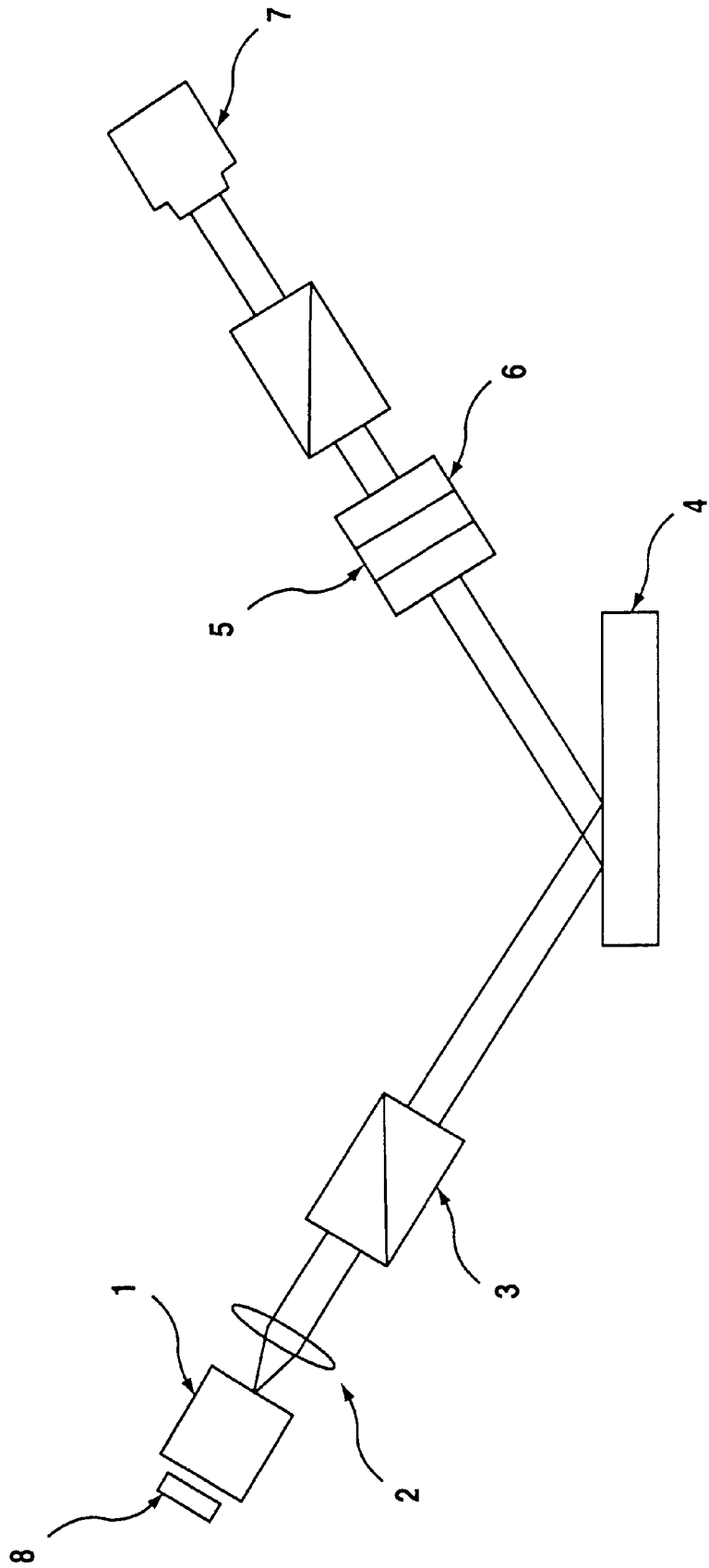
FIG. 3 is a general view of the constitution of the optics in the embodiment of present invention.

FIG. 3 shows the overall constitution of the ellipsometer of this embodiment.

Figure 4:
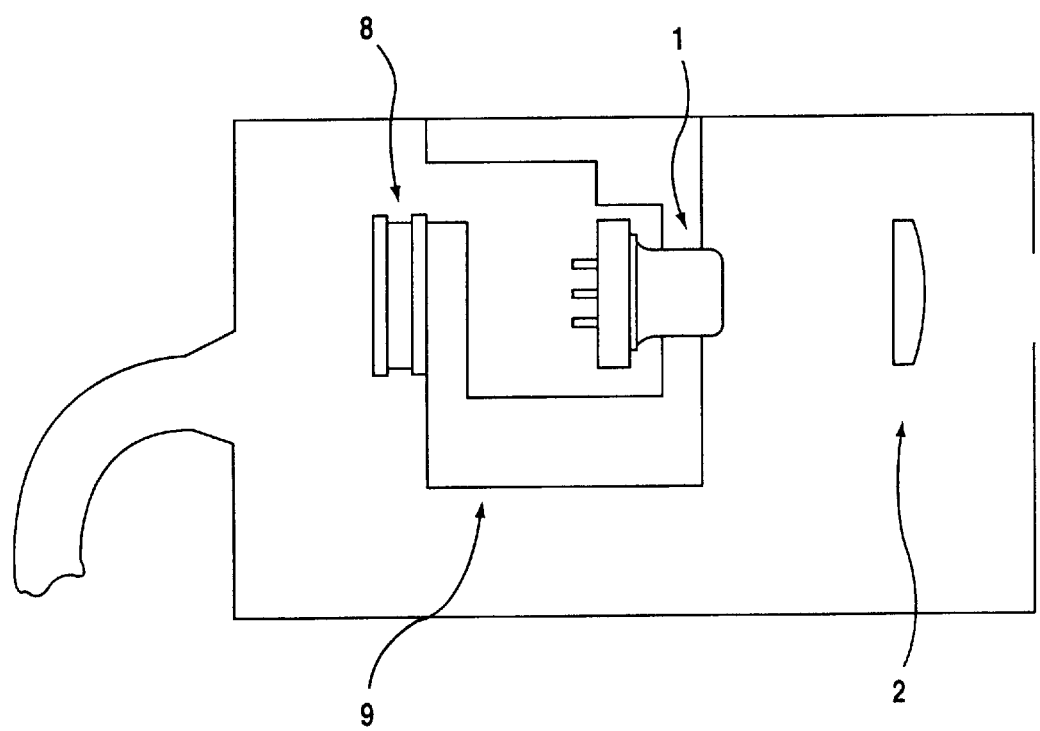
FIG. 4 is a schematic drawing showing the constitution of the temperature control portion of the light source in the embodiment of present invention.

FIG. 4 shows a schematic drawing showing the constitution of the temperature control portion of the light source of the ellipsometer of this embodiment.

Figure 5:
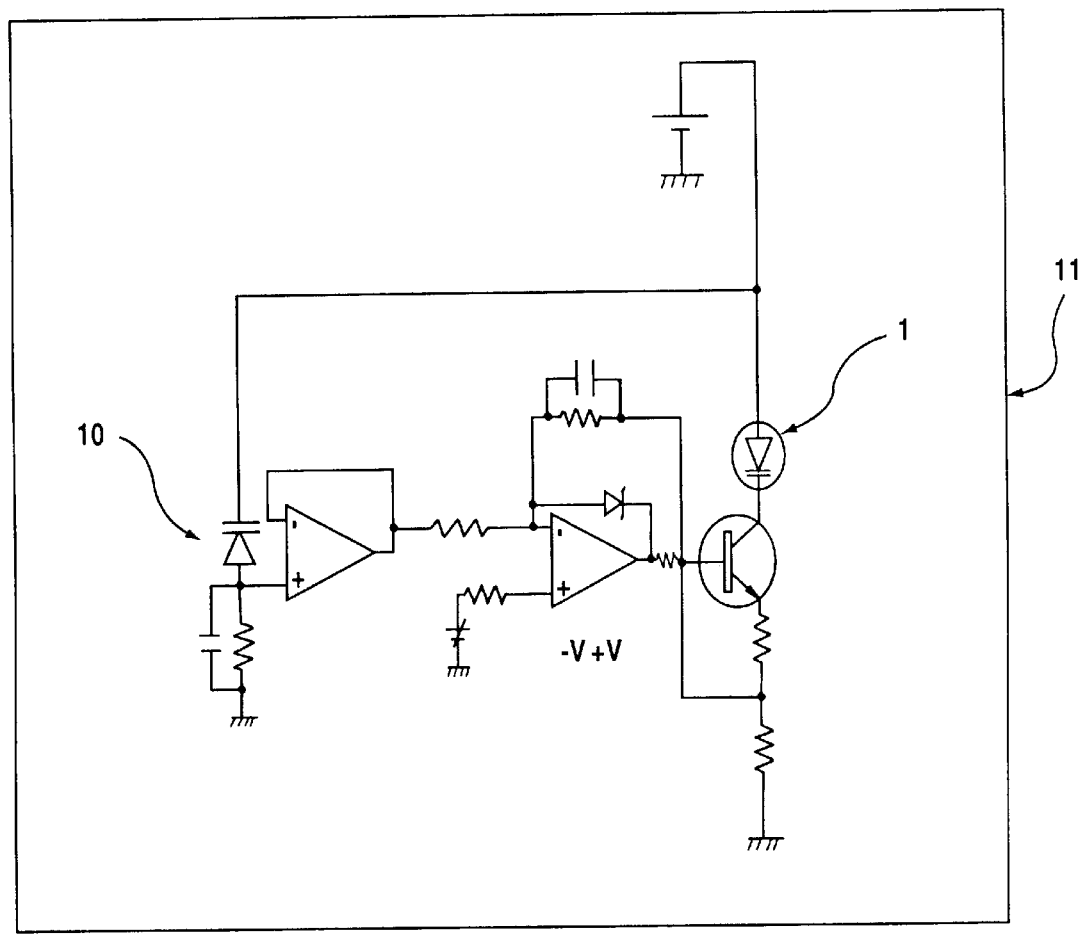
FIG. 5 is a diagram of a feedback circuit for optical output control in the embodiment of present invention.

FIG. 5 shows a diagram of a feedback circuit for optical output control of the ellipsometer of this embodiment.

Figure 6:
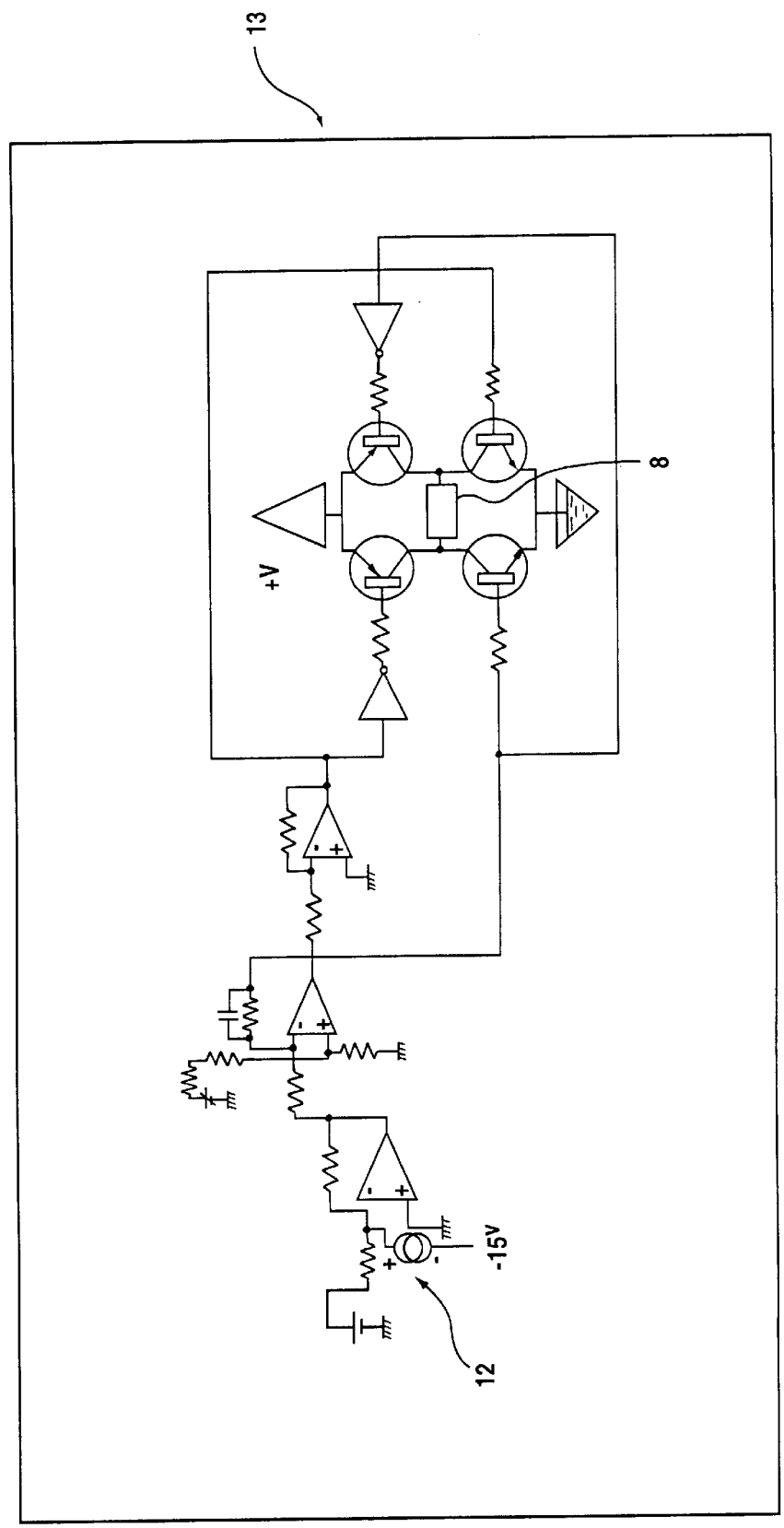
FIG. 6 is a diagram of a feedback circuit for temperature control in the embodiment of present invention.

FIG. 6 shows a diagram of a feedback circuit for temperature control of the ellipsometer of this embodiment.

In FIGS. 3,4,5 and 6, 1 is a semiconductor laser diode that serves as the light source, 2 is a collimator lens, 3 is a polarizer, 4 is a sample, 5 is a quarter wave plate, 6 is an analyzer, 7 is a photosensor, 8 is a Pertie device, 9 is a heat sink, 10 is a photodiode, 11 is a feedback circuit for optical output control, 12 is a temperature sensor and 13 is a feedback circuit for temperature control.

In general, infinite number of local optimum solutions exist during the calculation described in the explanation of FIG. 1. Thus, unless it is possible to start from a suitable initial value, the calculation will not reach a global optimum solution such that is guaranteed of being the physically correct solution. If an initial value suitable for searching is known based on, for example, knowledge about the sample, it is possible to reach at global optimum solution by starting from that initial value. When this is not the case, a suitable initial value must be set using another method.

The algorithm of FIG. 2 and system of FIG. 3 is able to provide a method for setting an initial value so as to reach a global optimum solution In FIG. 3, a semiconductor laser diode 1 equipped with a temperature control function is used for the light source of the elipsometer. Monochromatic light from light source 1 is transformed into parallel light by collimator lens 2, which is then converted to linearly polarized light by polarizer 3. This linearly polarized light is radiated onto sample 4 at a suitable incident angle, and the reflected light is passed through quarter wave plate 5 and analyzer 6 followed by measurement of the quantity of light with photosensor 7. In order to measure the polarized light, the light intensity on photosensor 7 is measured while changing any or each of the azimuth of the polarizer 3 on the incident side, the azimuth of the quarter wave plate 5 on the reflecting side, or the azimuth of the analyzer 6 by, for example, rotating the devices around the optical axis.

A Pertie device 8 is attached to the light source in the form of semiconductor diode laser 1 by thermal coupling. Pertie device 8 is also coupled with heat sink 9 to dissipate heat. The optical output of semiconductor laser 1 is monitored with photodiode 10 integrated into a single unit with laser 1. Optical output is controlled at a constant level during measurement by feedback circuit 11 for controlling optical output by monitoring the output current of photodiode 10.

The case temperature of semiconductor laser 1 can be changed by changing the current direction or current flowing to Pertie device 8. The case temperature of semiconductor laser 1 is monitored by thermally coupled temperature sensor 12. Case temperature is controlled to a constant temperature during measurement by feedback circuit 13 for controlling temperature by monitoring the output current of temperature sensor 12.

The wavelength of semiconductor laser 1 is determined by optical output and case temperature. When only the case temperature is changed while optical output is kept constant, wavelength is a linear function of case temperature. The temperature characteristic of wavelength of light is approximately 2.5 Å/° C.

Since it is a necessary condition that a measurement be performed at a constant wavelength during ellipsometric measurement, optical output and case temperature must be kept constant during a single measurement. In the present invention, the conditions for optical output and case temperature are varied as a means of aggressively varying the wavelength. Although the wavelength of light can be changed by changing the optical output as well, according to experimental results, changing the case temperature of the laser allows measurements to be made with greater accuracy.

$\tan \Psi_i$ and $\cos \Delta_\square$ are measured as a function of wavelength while controlling the case temperature $\square_\square$ of semiconductor laser 1 within the range of approximately $\pm 20°$ C. and changing the wavelength of the light source for each measurement. Namely, the spectra are measured for $\tan \Psi$ and $\cos \Delta$.

Next, the set of film thickness and refractive index of each layer of a multilayer $x = \{x_j\}$ as explanation variables are calculated according to the least squares method so as to minimize the difference f between the spectra of $\tan \Psi_\square$ and $\cos \Delta_\square$ actually measured and the calculated spectra of $\tan \Psi_{\square\square c}$ and $\cos \Delta_{\square\square c}$ that can be calculated from the explanation variables.

In this manner, the film thickness and refractive index of each layer of a multilayer film are obtained in the form of a first approximation.

In an ordinary spectroscopic ellipsometer, as a white light source is used for light source, the purity with respect to the wavelength of the light and the parallelism of the light rays within the beam are low. On the other hand, in the method of present invention, although the range over which wavelength is changed is comparatively narrow, the purity relative to the wavelength of the light source and the parallel beam of the light rays within the beam are high.

In general, the spectra of refractive index and extinction coefficient of a material are not independent (dispersion relation). In an ordinary spectroscopic ellipsometer the wavelength range is considerably wide, then it is necessary to establish hypotheses subject to considerable argument with respect to the wavelength characteristics of refractive index and extinction coefficient. On the other hand, in the method of the present invention, since the range of the change in wavelength is narrow, the wavelength characteristics of refractive index and extinction coefficient can be considered to be linear function of the wavelength of light within the range of this wavelength change.

In an ordinary spectroscopic ellipsometer this model fitting is the terminal point of calculation. On the other hand, in the method of present invention, thus obtained model is a starting point as the first approximation for calculation described in the explanation of FIG. 1.

The overall measurement procedure performed using the ellipsometer system of FIGS. 3 4, 5 and 6 with the algorithm of FIGS. 1 and 2 is describe below.

To begin with, a model of the optical constants of each layer of the sample is determined in the form of a first approximation by measuring spectra of $\tan \Psi$ and $\cos \Delta$ changing the wavelength.

Next, $\tan \Psi$ and $\cos \Delta$ are measured at a specific wavelength.

Next, the film thickness of an arbitrary layer is calculated using $\tan \Psi$ and $\cos \Delta$ starting from the model of optical constants for each layer in the form of a first approximation, after which the optical constants of each layer are optimized so as to minimize the absolute value of the imaginary part of film thickness.

What is claimed is:

1. An ellipsometer for measuring samples having multilayer films that require multivariable measurements, comprising:
    a semiconductor laser diode in the form of a light source that radiates light;
    a Pertie device for changing the case temperature of said laser diode;
    a collimator for transforming incident light into a parallel beam;
    a polarizer for transforming said light into suitable linearly polarized light and radiating said light onto said sample;
    an analyzer for converting reflected light into linearly polarized light;
    a photosensor for measuring said reflected light; and
    calculating means for calculating optical constants of each layer of the multilayer films from measured values of $\tan \psi$ and $\cos \Delta$ at a fixed wavelength in the form of optimization problems for minimizing error terms involved in calculating film thickness.

2. The ellipsometer of claim 1, wherein the case temperature of semiconductor laser can be changed by changing the current direction or current flowing to Pertie device.

3. The ellipsometer of claim 2, wherein the case temperature of semiconductor laser diode is changed to measure spectra of $\tan \Psi$ and $\cos \Delta$ as function of wavelength of the light source.

4. A method to find the model of the set of refractive index and film thickness of each layer of a multilayer film in an ellipsometer, said ellipsometer having a semiconductor laser diode in the form of a light source that radiates light, a Pertie device for changing the case temperature of said laser diode, a collimator for transforming incident light into a parallel beam, a polarizer for transforming said light into suitable linearly polarized light and radiating said light onto said sample, an analyzer for converting reflected light into linearly polarized light, and a photosensor for measuring said reflected light, said method comprising the steps of:
    (a) from the knowledge about the sample, assuming the initial values of optical constants of sample, then set an initial model of sample;
    (b) from said model of sample, calculating spectra of $\tan \psi$ and $\cos \Delta$ as a function of wavelength of light; and
    (c) calculating the difference between the said actually measured spectra of $\tan \psi$ and $\cos \Delta$ and the said calculated spectra of $\tan \psi$ and $\cos \Delta$,
wherein the set of film thickness and refractive index of each layer of a multilayer film are calculated according to the least squares method so as to minimize the said difference, wherein said calculated set of film thickness and refractive index of each layer of a multilayer film is the model of sample.

5. A method to calculate the set of film thickness and refractive index of each layer of a multilayer film, comprising the steps of:
    (a) measuring $\tan \psi$ and $\cos \Delta$ of a sample at a constant wavelength of the light;
    (b) from the knowledge about the sample, assuming the set of initial values and the range of values of optical constants of sample;
    (c) calculating the film thickness of arbitrary layer from the set of optical constants of sample and measured $\tan \psi$ and $\cos \Delta$; and
    (d) calculating the gradient vector and Hessian matrix of imaginary part of said film thickness at a said set of optical constants, wherein if said gradient vector is almost zero and said Hessian matrix is positive constant and said imaginary part of film thickness is almost zero, then the set of film thickness and refractive index of each layer of a multilayer film are determined value;

otherwise a new set of optical constants are searched, and return to the step of calculating the film thickness of the arbitrary layer.

6. The method of claim 5, wherein said set of initial values of optical constants of sample are a model of sample.

7. The method of claim 5, wherein said searching is made by the method of steepest searching.

8. The method of claim 5, wherein said searching is made by the quasi-Newton method.

* * * * *